UNITED STATES PATENT OFFICE.

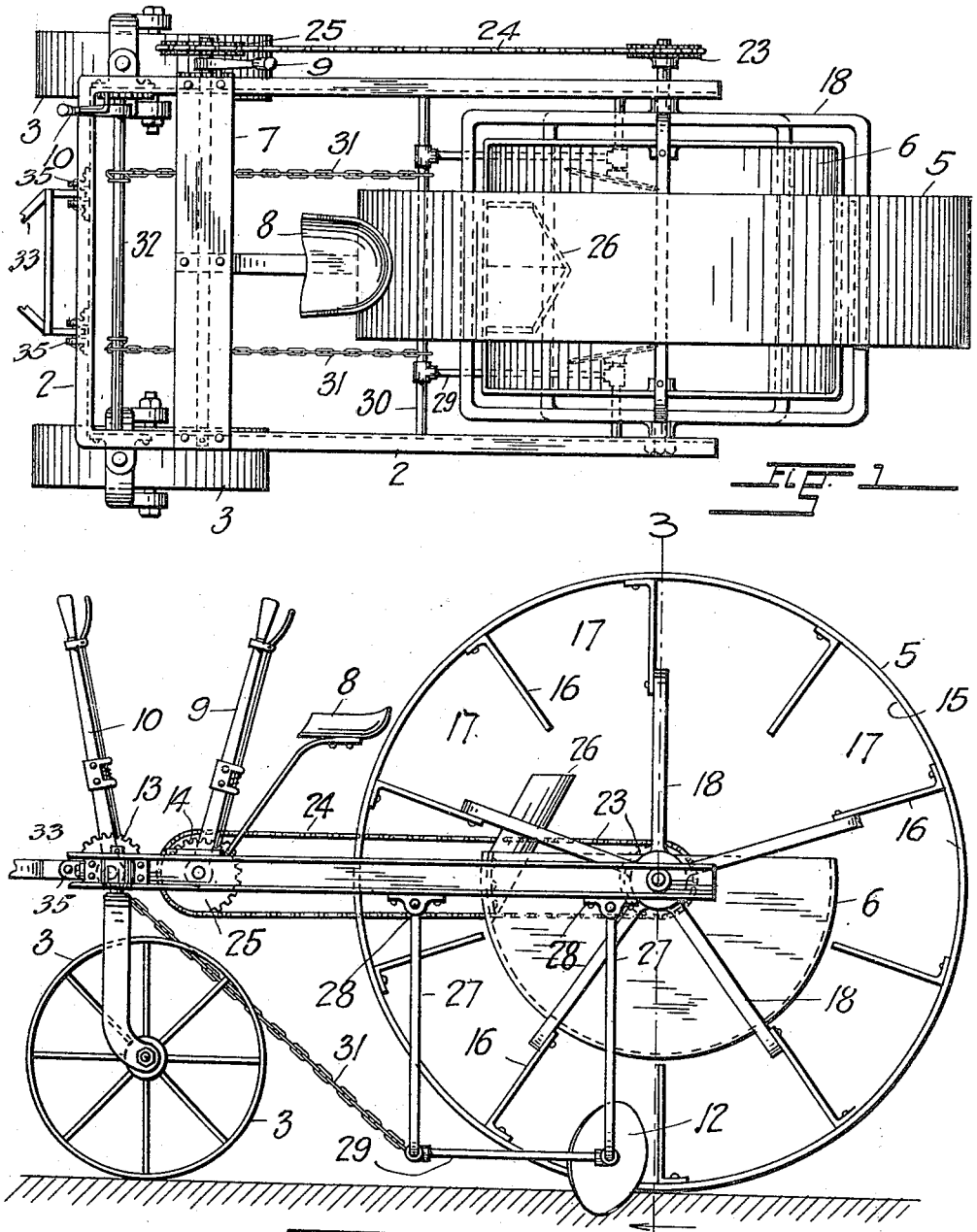

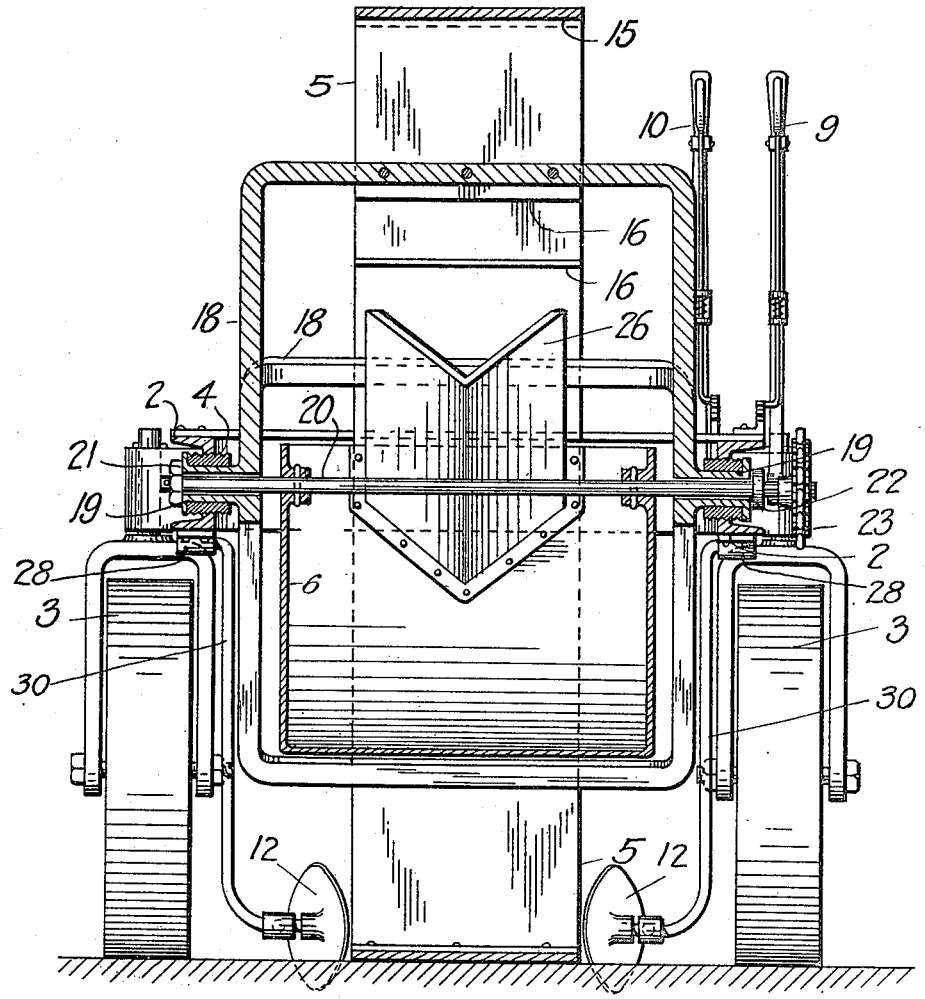

DANIEL C. FUNCHEON, OF DENVER, AND ALVA V. NUTT, OF EDGEWATER, COLORADO.

SELF-LOADING WHEELER.

1,215,792.

Specification of Letters Patent.

Patented Feb. 13, 1917.

Application filed April 14, 1915. Serial No. 21,400.

*To all whom it may concern:*

Be it known that we, DANIEL C. FUNCHEON and ALVA V. NUTT, citizens of the United States, and residents, respectively, of Denver, in the county of Denver and State of Colorado, and of Edgewater, in the county of Jefferson and State of Colorado, have invented certain new and useful Improvements in Self-Loading Wheelers, of which the following is a specification.

Our invention relates to self-loading vehicles of the type commonly known as "wheelers," and its primary object resides in the provision of a wheel supported machine of very simple and compact construction, which is particularly adapted for the excavation and removal of dirt in the construction of roads and ditches and other grading work.

With the above objects in view, our improved wheeler comprises a ground wheel having internally about its periphery, earth lifting buckets which upon reaching a determinate elevation discharge their contents into the body or receptacle of the vehicle which is hung within the bucket wheel.

A pair of cultivator disks adjustably mounted at opposite sides of the wheel, excavate the dirt during forward movement of the vehicle and throw it into the lower buckets of the wheel, and the vehicle body is mounted so that it can be tilted or reversed for the discharge of its contents.

Having thus briefly described the construction of our improved self-loading vehicle, we will now proceed to explain the same in detail by reference to the accompanying drawings, in the various views of which like parts are similarly designated, and in which, Figure 1 is a plan view of the machine, Fig. 2, a side elevation of the same, and Fig. 3, a transverse section taken along the line 3—3, Fig. 2.

Referring to the drawings, the reference numeral 2 designates a U-shaped frame preferably composed of channel iron, which at its forward end is supported upon a pair of pivoted caster wheels 3.

The frame carries at its rearward ends, boxes 4 to support the rotary bucket wheel 5 and the vehicle body 6 and it is provided at its opposite end with a tongue 33 for the attachment of draft animals, which is pivoted for movement about a horizontal axis as at 35.

A transverse brace 7 secured on the frame forward of the bucket wheel, supports the driver's seat 8, and levers 9 and 10 which control the position of the body 6 and the cultivator disks 12 hereinafter to be described are fulcrumed at one side of the frame within reaching distance of the seat 8, in association with toothed segments 13 and 14 which lock them in their adjusted positions.

The ground wheel 5 consists of a flat, wide rim 15 provided internally with radially extending flights 16 which form open-ended buckets 17 in which the earth is lifted during rotation of the wheel.

A plurality of yokes 18 which are rigidly secured to the flights at equidistant points in the circumference of the wheel, diverge radially from hollow trunnions 19 which are alined in the axis of the wheel and which are rotatably fitted in the boxes 4.

The vehicle body is composed of a substantially semi-cylindrical receptacle closed at its ends and secured to a shaft 20 with which it is coaxial.

The shaft extends at its ends loosely through the hollow trunnions 19 and it is held against longitudinal displacement by suitable means such as a nut 21 and a collar 22.

The shaft is provided at one end with a sprocket wheel 23 which by means of a chain 24 is coöperatively connected with a similar wheel 25 mounted for conjunctive movement with the controlling lever 9.

By moving the latter about its fulcrum, the driver of the vehicle can thus tilt or reverse the position of the vehicle body for the purpose of discharging its contents at opposite sides of the bucket wheel.

With this end in view, the vehicle body has been made longer than the wheel is wide, so as to protrude at opposite sides thereof and it is provided with a deflector 26 which when the position of the receptacle is reversed, prevents its contents from discharging onto the rim of the wheel, by conducting it to points at opposite sides of the same.

The cultivating disks 12 are slantingly disposed at opposite sides of the wheel to throw the turned up dirt into the buckets of the same during forward movement of the vehicle.

The disks are rotatably mounted at the lower portion of two swinging hangers which are suspended from the frame of the vehicle.

The hangers are each composed of two parallel bars 27 which at their upper ends are pivoted in boxes 28 on the under side of the frame 2 and which at their lower ends are articulately connected with a cross bar 29.

The two hangers at opposite sides of the frame are connected by a transverse bar 30 which by means of a pair of chains 31 is attached to a rotary winding rod 32 mounted transversely at the front end of the frame, in connection with the controlling lever 10.

From the foregoing description, the operation and advantages of our improved wheeler will be readily understood.

Drawn by the animals attached to the pole at its forward end, the machine is propelled along a surface to be graded. The disks 12 which are lowered to the required depth by means of the lever 10, throw the turned up earth into the buckets of the wheel which carry it upwardly to a point of discharge above the receptacle 6.

When the vehicle body is loaded, the driver, by manipulation of the controlling lever 9, reverses its position and thereby unloads the dirt at opposite sides of the wheel.

The caster wheels upon which the front end of the frame is supported, facilitate the movement of the vehicle in the direction in which it is drawn, and the pivotal connection of the tongue with the frame permits the vehicle to move freely across rough and uneven surfaces.

Having thus described our invention what we claim and desire to secure by Letters-Patent is:

1. In a self-loading wheeler, the combination with a reversible earth-receptacle, of an earth-lifting ground wheel encircling the same, and deflecting means for diverting the contents of the receptacle during its reversal to points of discharge at the ends of the same.

2. In a self-loading vehicle, a frame, an earth lifting ground-wheel having hollow trunnions in bearings on the frame, an earth-receptacle inside said wheel having trunnions within the first-mentioned trunnions, and a lever connected with a trunnion of the receptacle, for reversing its position.

3. In a self-loading vehicle, a frame, a ground wheel having inwardly extending, earth-lifting flights, yokes radiating from axially alined trunnions, connected with said flights, the frame having bearings in which said trunnions are fitted, and a receptacle mounted on the frame within the wheel.

4. In a self-loading vehicle, a frame, an earth-receptacle at the rear end thereof, an earth lifting wheel rotatable on the frame and encircling the receptacle, connected frames movably suspended from the frame at opposite sides of the wheel, excavating devices on said frames, and means for the adjustment of said frames by swinging them about their points of suspension.

5. In a self-loading vehicle, an earth-lifting ground wheel, an earth receptacle mounted within said wheel for movement about an axis coincident with that of the wheel, and deflecting means for diverting the contents of the receptacle during pivotal movement of the same, to a point of discharge outside the rim of the wheel.

In testimony whereof we have affixed our signatures in presence of two witnesses.

DANIEL C. FUNCHEON.
ALVA V. NUTT.

Witnesses:
G. J. ROLLANDET,
L. RHOADES.